United States Patent
Yokoyama (10) Patent No.: US 8,115,942 B2
(45) Date of Patent: Feb. 14, 2012

(54) IMAGE FORMING APPARATUS AND IMAGE FORMING METHOD

(75) Inventor: Hidehiko Yokoyama, Machida (JP)

(73) Assignee: Canon Kabushiki Kaisha, Tokyo (JP)

( * ) Notice: Subject to any disclaimer, the term of this patent is extended or adjusted under 35 U.S.C. 154(b) by 506 days.

(21) Appl. No.: 12/411,042

(22) Filed: Mar. 25, 2009

(65) Prior Publication Data
US 2009/0244590 A1 Oct. 1, 2009

(30) Foreign Application Priority Data

Mar. 31, 2008 (JP) ................. 2008-092207

(51) Int. Cl.
*G06K 15/00* (2006.01)
*G06F 3/12* (2006.01)
(52) U.S. Cl. ...................... 358/1.14; 358/1.1
(58) Field of Classification Search .......... 358/1.14
See application file for complete search history.

(56) References Cited

U.S. PATENT DOCUMENTS

| | | | |
|---|---|---|---|
| 7,167,258 B2* | 1/2007 | Yamamoto | 358/1.15 |
| 2002/0140984 A1* | 10/2002 | Tullis | 358/3.02 |
| 2002/0186393 A1* | 12/2002 | Pochuev et al. | 358/1.13 |
| 2003/0090697 A1* | 5/2003 | Lester et al. | 358/1.14 |
| 2005/0024676 A1* | 2/2005 | Yamagishi | 358/1.15 |
| 2005/0169651 A1* | 8/2005 | Yamada | 399/49 |
| 2006/0221370 A1* | 10/2006 | Iida | 358/1.13 |
| 2007/0162594 A1* | 7/2007 | Henry et al. | 709/224 |
| 2007/0201059 A1* | 8/2007 | Radzykewycz et al. | 358/1.9 |
| 2008/0070222 A1* | 3/2008 | Crowhurst | 434/350 |
| 2008/0144086 A1* | 6/2008 | Shibao | 358/1.15 |
| 2009/0141299 A1* | 6/2009 | Osada | 358/1.13 |
| 2009/0219557 A1* | 9/2009 | Lifshitz et al. | 358/1.13 |

FOREIGN PATENT DOCUMENTS

| | | |
|---|---|---|
| JP | H10-016304 A | 1/1998 |
| JP | 2004-268594 A | 9/2004 |

* cited by examiner

*Primary Examiner* — Twyler Haskins
*Assistant Examiner* — Helen Q Zong
(74) *Attorney, Agent, or Firm* — Canon U.S.A., Inc. IP Division (57) ABSTRACT

An image forming apparatus detects whether a sub board, which performs image processing, is in a processing-disabled state. If it is detected that the sub board is in the processing-disabled state, the image forming apparatus activates a virtual environment on a main board, which performs information processing, to allow an image processing unit configured to perform the image processing to run on the virtual environment. The image forming apparatus transfers data processed by the image processing unit to the sub board when the sub board comes into a processing-enabled state and then prints and outputs the data via a print engine.

13 Claims, 7 Drawing Sheets

IMAGE FORMING APPARATUS AND IMAGE FORMING METHOD

BACKGROUND OF THE INVENTION

1. Field of the Invention

The present invention relates to an image forming apparatus, such as a printing apparatus and a multifunction peripheral, and an image-forming method thereof.

2. Description of the Related Art

Recently, in an image forming apparatus having a plurality of functions, such as a printing apparatus and a multifunction peripheral, reduction of power consumption is desired from the viewpoint of energy saving, and therefore, a technical issue of how to control the increase of power consumption associated with the increase of additional functions has been addressed.

However, a conventional image forming apparatus is configured to perform an image forming process in a single system, so that the power consumption of the entire image forming apparatus needs to be reduced in order to save power supply to a print engine, which is the most power consuming part in the system.

Further, when the entire image forming apparatus is turned off due to power reduction, for example, a problem arises in that print processing, such as print output in progress, is aborted. In order to resolve the above-described problem, for example, Japanese Patent Application Laid-Open No. 2004-268594 discusses a method that, if one of the image forming apparatuses stops a printing process while the printing is performed dispersedly by a plurality of image forming apparatuses, any one of the other image forming apparatuses alternatively takes over the printing process, thereby outputting a print from the alternative image forming apparatus.

However, in the method discussed in Japanese Patent Application Laid-Open No. 2004-268594, there is a case that an output result cannot be obtained from a desired image forming apparatus. Further, any difference between a property of the print engine of the image forming apparatus initially scheduled for outputting and that of the alternative image forming apparatus may cause a difference in the output result, for example, a difference in the density of an image.

Meanwhile, there have been various demands for more functions to be added to an image forming apparatus such as a printing apparatus and a multifunction peripheral. Accordingly, continuous attempts are made to increase performance in hardware to enable precisely processing information related to such diverse functions implemented in recent image forming apparatuses. For example, in the most recent central processing unit (CPU), a technique that is called virtualization has been applied. Virtualization enables a plurality of operating systems (OSs) to run concurrently.

SUMMARY OF THE INVENTION

The present invention is directed to an image forming apparatus capable of obtaining a desired image without a delay of processing and capable of effectively controlling power consumption by using a virtual technique even when a system for an image forming process of the image forming apparatus is in a stopped state.

According to an aspect of the present invention, an image forming apparatus includes a first system, a second system, and an output engine and is configured to process input data via the first system and the second system and to output the processed data as an image via the output engine. The first system includes a first communication unit configured to communicate with the second system, a detection unit configured to detect whether the second system is in a processing-disabled state, a virtual environment activation unit configured to activate a virtual environment running on the first system if the detection unit detects that the second system is in the processing-disabled state, and a first image processing unit configured to perform image processing under the virtual environment. The second system includes a second communication unit configured to communicate with the first system, a second image processing unit configured to perform image processing on data received from the first system, and an output engine control unit configured to control the output engine. The output engine is configured to output the processed data as an image under control of the output engine control unit.

According to an exemplary embodiment of the present invention, for example, power can be supplied to a second system only as required, and therefore, the power consumption can be effectively controlled in the image forming apparatus. Further, even in the case where the second system temporarily cannot accept a processing request due to overload or the like, a first system performs image processing that is to be performed by the second system. Accordingly, a difference in an image output, which may occur when different image forming apparatuses perform image processing, can be reduced, so that a high-quality image can be output.

Further features and aspects of the present invention will become apparent from the following detailed description of exemplary embodiments with reference to the attached drawings.

BRIEF DESCRIPTION OF THE DRAWINGS

The accompanying drawings, which are incorporated in and constitute a part of the specification, illustrate exemplary embodiments, features, and aspects of the invention and, together with the description, serve to explain the principles of the invention.

DETAILED DESCRIPTION OF THE EMBODIMENTS

Various exemplary embodiments, features, and aspects of the invention will be described in detail below with reference to the drawings.

Figure 1:
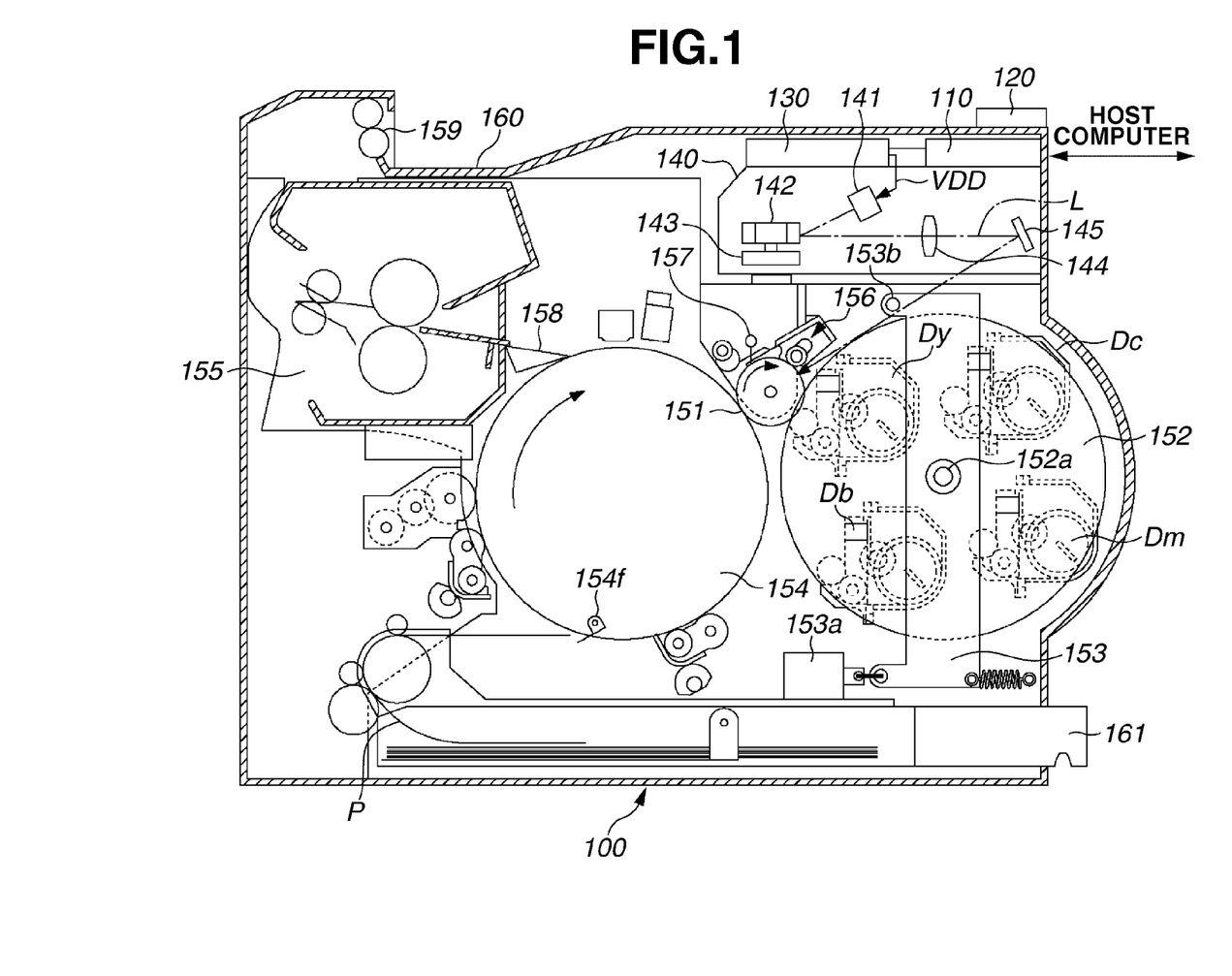
FIG. 1 is a cross sectional view illustrating an exemplary configuration of a color laser beam printer (color LBP) as an example of an image forming apparatus according to a first exemplary embodiment of the present invention.

FIG. 1 is a cross sectional view illustrating an exemplary configuration of a color laser beam printer (hereinafter referred to as a "color LBP") as an example of an image forming apparatus according to a first exemplary embodiment of the present invention.

A color LBP 100 illustrated in FIG. 1 receives and stores a print command including print data (e.g., character code and image data) and a control code supplied from an externally connected host computer. Then, the color LBP 100 generates a character pattern, an image, or the like to form a visual image on a recording sheet as an example of a print medium according to the received print command.

In the color LBP 100, a formatter control unit 110 analyzes the print command supplied from the host computer as an external device and performs a print image generation process. Further, the formatter control unit 110 controls the color LBP 100. Further, the formatter control unit 110 is connected to an operation panel unit 120 configured to enable a user to operate the color LBP 100 and to notify the user of the present status of the color LBP 100.

The operation panel unit 120 includes a switch, a light-emitting diode (LED) display device, or the like, and, for example, is mounted on the color LBP 100 as a part of the housing of the color LBP 100. The formatter control unit 110 delivers a generated final print image to an output control unit 130 in the form of a video signal.

The output control unit 130 inputs a state of the color LBP 100 from various sensors (not shown) and outputs a control signal to an optical unit 140 and various drive-line mechanism units. Namely, the output control unit 130 acts to control a printing process of the color LBP 100.

Now, a printing operation of the color LBP 100 will be described below with reference to each constituent element. In the color LBP 100, the leading edge of a recording sheet P supplied from a sheet cassette 161 is pinched by a gripper 154f to be held on the outer periphery of a transfer drum 154. An electrostatic latent image of a document image separated into four colors, which is formed on a photosensitive drum 151 by an optical unit 140, is developed by development units Dy, Dm, Dc, and Db, corresponding to colors of yellow (Y), magenta (M), cyan (C), and black (B), respectively, in this order. A color image is formed on the recording sheet P by transferring each toner image obtained as a result of development to the recording sheet P on the transfer drum 154 in a superimposed manner.

Subsequently, the recording sheet P is separated from the transfer drum 154 and conveyed to a fixing unit 155. In the fixing unit 155, the toner images are fixed to the recording sheet P by heating and pressurizing. Then, the recording sheet P is discharged from a sheet discharge unit 159 to a sheet discharge tray unit 160.

Here, each development unit Dy, Dm, Dc, or Db of each color has rotation support shafts at both ends thereof. Each development unit is held by a development unit selecting mechanism unit 152 so as to allow each development unit to rotate around the rotation support shafts. Accordingly, each development unit Dy, Dm, Dc, or Db can keep its own position at a predetermined position even when the development unit selecting mechanism unit 152 rotates around a rotation shaft 152a in a manner as illustrated in FIG. 1 to select the development unit.

The development unit selecting mechanism unit 152, in synchronization with the development units Dy, Dm, Dc, and Db, moves rotatably around a supporting point 153b in such a manner that a selecting mechanism holding frame 153 is pulled towards the photosensitive drum 151 by a solenoid 153a. Accordingly, after the selected development unit Dy, Dm, Dc, or Db moves to a development position, the development units Dy, Dm, Dc, and Db of the corresponding colors move towards the photosensitive drum 151 to perform a development process. Here, the photosensitive drum 151 is uniformly charged in a predetermined polarity by an electric charger 156.

Further, the print command, rasterized into a device-dependent bitmap by the formatter control unit 110, is converted into a video signal having a corresponding pattern, and is output to a laser driver (not shown) to drive a semiconductor laser 141. Laser light emitted from the semiconductor laser 141 in response to the input video signal is reflected by a polygon mirror 142, which is moved at high speed by a scanner motor 143 while the laser light is controlled in an alternate ON/OFF state. The laser light scans the photosensitive drum 151 through a polygon lens 144 and a reflection mirror 145 and exposes the photosensitive drum 151. Accordingly, an electrostatic latent image corresponding to the video signal is formed on the photosensitive drum 151. In the electrostatic latent image, for example, an electrostatic latent image of M (magenta) color is developed by the development unit Dm for M (magenta) color, so that a first toner image of M (magenta) color is formed on the photosensitive drum 151.

Further, the recording sheet P is supplied concurrently with the formation of the electrostatic latent image at a predetermined timing. A transfer bias voltage having a polarity opposite to that of the toner (for example, a positive polarity) is applied to the transfer drum 154. Consequently, the first toner image on the photosensitive drum 151 is transferred onto the recording sheet P, and the recording sheet P is electrostatically attracted to the surface of the transfer drum 154. Subsequently, a cleaner 157 removes the M (magenta) color toner remaining on the photosensitive drum 151. Accordingly, the photosensitive drum 151 becomes ready for formation of a latent image of the next color and the development process of this latent image. A second, third, and fourth color toner images, corresponding to colors C (cyan), Y (yellow), and Bk (black), respectively, are transferred to the recording sheet P in this order according to similar processes, except that a bias voltage higher than that previously used is applied to the transfer drum 154 when each latent image of colors C, Y, and Bk is transferred to the recording sheet P.

As the leading edge of the recording sheet P, to which the toner images of four colors have been transferred in a superimposed manner, comes close to a separating position, a separating claw 158 comes close to the transfer drum 154 and the top edge of the separating claw 158 contacts the surface of the transfer drum 154 to separate the recording sheet P from the transfer drum 154. The thus-separated recording sheet P is conveyed to the fixing unit 155, where the recording sheet P is fixed with the toner image, to be discharged into the sheet discharge tray unit 160.

The image forming apparatus according to the present exemplary embodiment of the present invention is not limited to the color LBP 100 described above, but can be a color or a monochroic (black and white) printing apparatus or a multi-function peripheral of another type, such as an inkjet type or a thermal transfer type.

Figure 2:
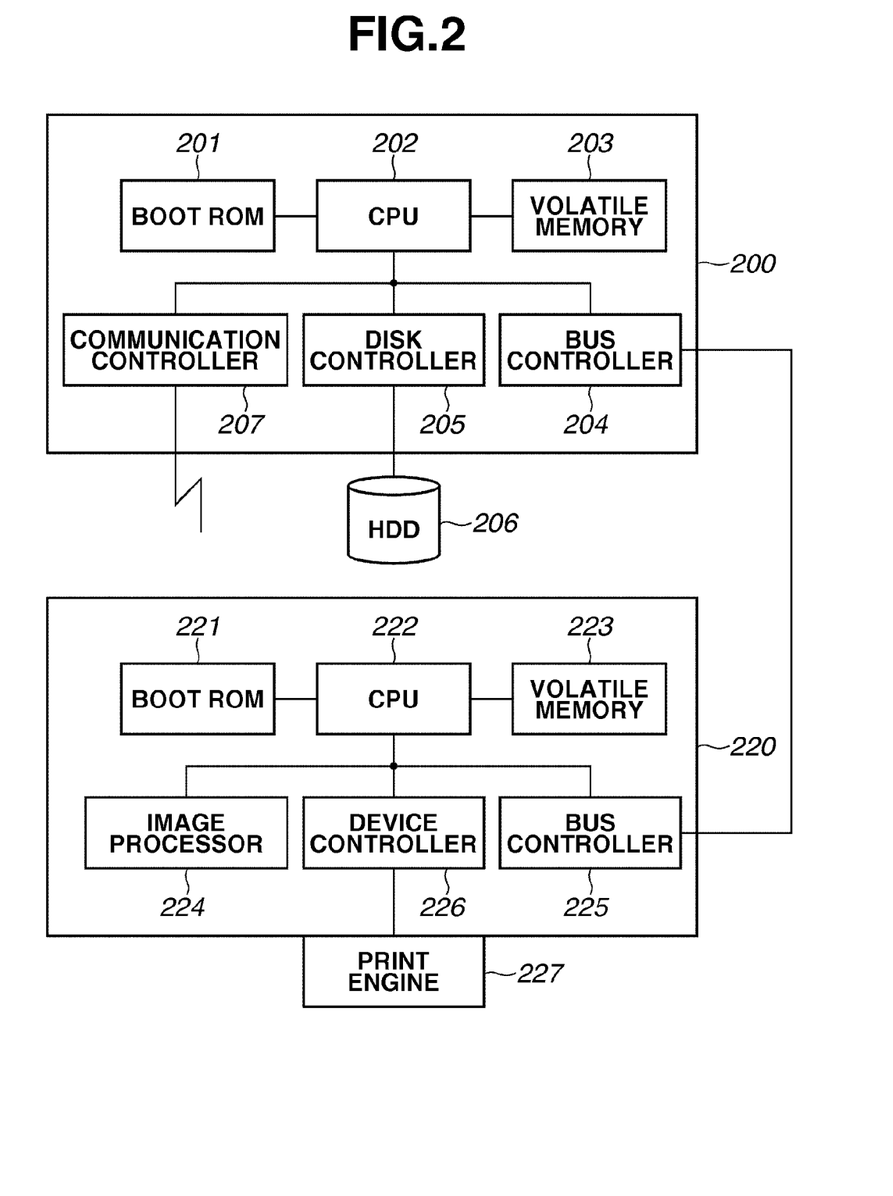
FIG. 2 is a configuration diagram of a controller board of the color LBP according to the first exemplary embodiment of the present invention.

FIG. 2 is a configuration diagram of a controller board, which controls the color LBP 100 and realizes the processing according to the exemplary embodiment of the present invention. The present apparatus generally includes a main board 200 acting for general information processing (including a function of the formatter control unit 110 of FIG. 1) and a sub board 220 acting for image processing (including a function of the output control unit 130 of FIG. 1). Here, the main board 200 and the sub board 220 can be integrated into a single board. However, the present exemplary embodiment will be described below presuming that the apparatus includes the main board 200 and the sub board 220 separately for the sake of a brief explanation.

The main board 200 includes a boot read-only memory (ROM) 201 as a non-volatile memory storing a boot program, a CPU 202 as an operational device for executing the boot program and other programs, and a volatile memory 203 for temporarily storing a program or data. The main board 200 further includes a bus controller 204 acting for connection with the sub board 220 and a disk controller 205 for controlling a hard disk drive (HDD) 206. Further, the main board 200 includes a communication controller 207 for controlling a network, a universal serial bus (USB), or the like, which acts for communication with an information processing apparatus as an external device.

On the other hand, the sub board 220 includes a boot ROM 221 as a non-volatile memory storing a boot program, a CPU 222 as an operational device for executing the boot program and other programs, and a volatile memory 223 for temporarily storing a program or data. The sub board 220 further includes a bus controller 225 acting for connection with the main board 200 and an image processor 224, which is hardware capable of executing an image forming process at high speed. Further, the sub board 220 includes a device controller 226 for controlling devices. The device controller 226 is adapted to control an image forming device, such as the print engine 227, connected to the image forming apparatus.

Now, the image forming process performed by the color LBP 100 according to the present exemplary embodiment will be described below. Prior to the description of the image forming process according to the present exemplary embodiment, the image forming process performed by a conventional image forming apparatus will be described with reference to a functional configuration diagram illustrated in FIG. 7. Here, the image forming process is a process where the input data is processed to form an image, followed by printing out the image.

Figure 7:
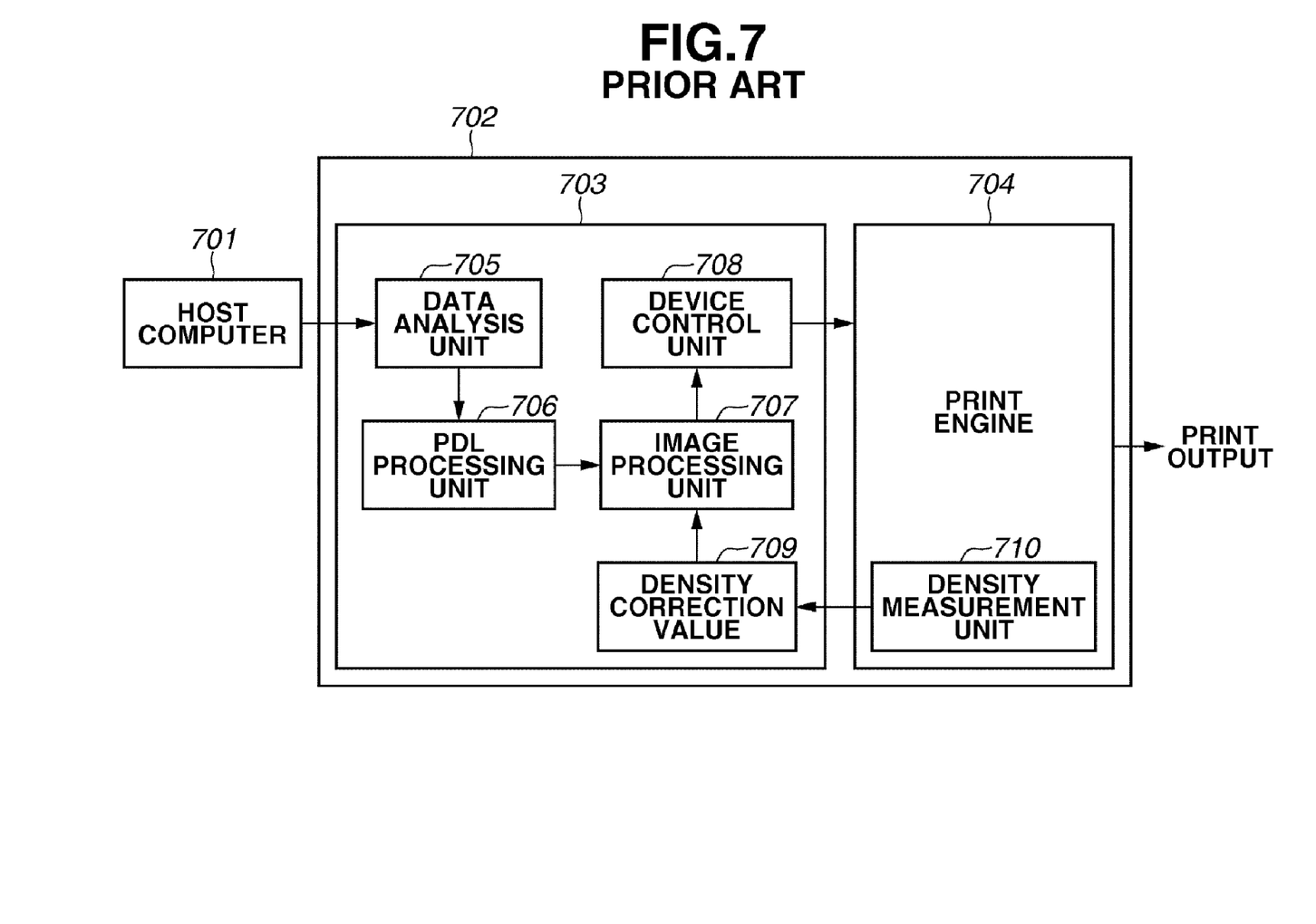
FIG. 7 is a functional configuration view illustrating an image forming process performed by a conventional image forming apparatus.

An information processing apparatus (host computer) 701 as illustrated in FIG. 7 sends an image forming request to an image forming apparatus 702. The image forming apparatus 702 performs an image forming process based on the thus-received image forming request. The image forming apparatus 702 generally includes a controller board 703 and a print engine 704. Namely, the image forming process is mainly performed by the controller board 703 and the print engine 704.

Here, the controller board 703 includes a data analysis unit 705, a page description language (PDL) processing unit 706, an image processing unit 707, and a device control unit 708, as function units. Further, the print engine 704 includes a density measurement unit 710. The image forming process to be substantially performed by each of the above-described units will be described below.

When the data analysis unit 705 receives an image forming process request, which is called a job, from the information processing apparatus 701, the data analysis unit 705 analyzes the content of the request. If the data is not processible, the data analysis unit 705 stops processing the data and sends an error message to the information processing apparatus 701. On the other hand, if the data is processible, the data analysis unit 705 transfers the data to the PDL processing unit 706. The PDL processing unit 706 analyzes an image output instruction in the thus-received data, which is called PDL, and generates intermediate data. After completing the analysis of the PDL, the image processing unit 707 performs image processing, such as density correction, color processing, and scaling, based on the generated intermediate data. Thus, a print image is generated. When the processing is completed with respect to the intermediate data, the device control unit 708 sends the print image to the print engine 704 to thereby obtain a print output.

When the print engine 704 generates a print output, toner density may differ between an actually output toner density and an assumed density depending on conditions of, for example, temperature, humidity, and the remaining amounts of toner. In order to resolve this problem, for example, such a patch detection method as discussed in Japanese Patent Application Laid-Open No. 10-016304 is widely used, wherein a density measuring pattern which is called a patch is output to read the output pattern. With the patch detection method, an output density under the present environment is measured and a parameter of the image processing is adjusted based on the thus-measured density value. Accordingly, an image output intended by the user can be realized. In FIG. 7, the density measurement unit 710 corresponds to the patch detection method. The value measured by the density measurement unit 710 is stored in the controller board 703 as a density correction value 709, which is used in the image processing performed by the image processing unit 707.

Now, the image forming process performed by the color LBP 100 according to the present exemplary embodiment will be described below with reference to a functional configuration diagram illustrated in FIG. 3. The image forming process according to the present exemplary embodiment differs from that performed by the conventional image forming apparatus 702 in that an image processing step in the image forming process can be performed by two systems. A detailed description will be provided below, with the same components in FIGS. 2 and 7 provided with the same reference symbols and the descriptions thereof omitted.

Figure 3:
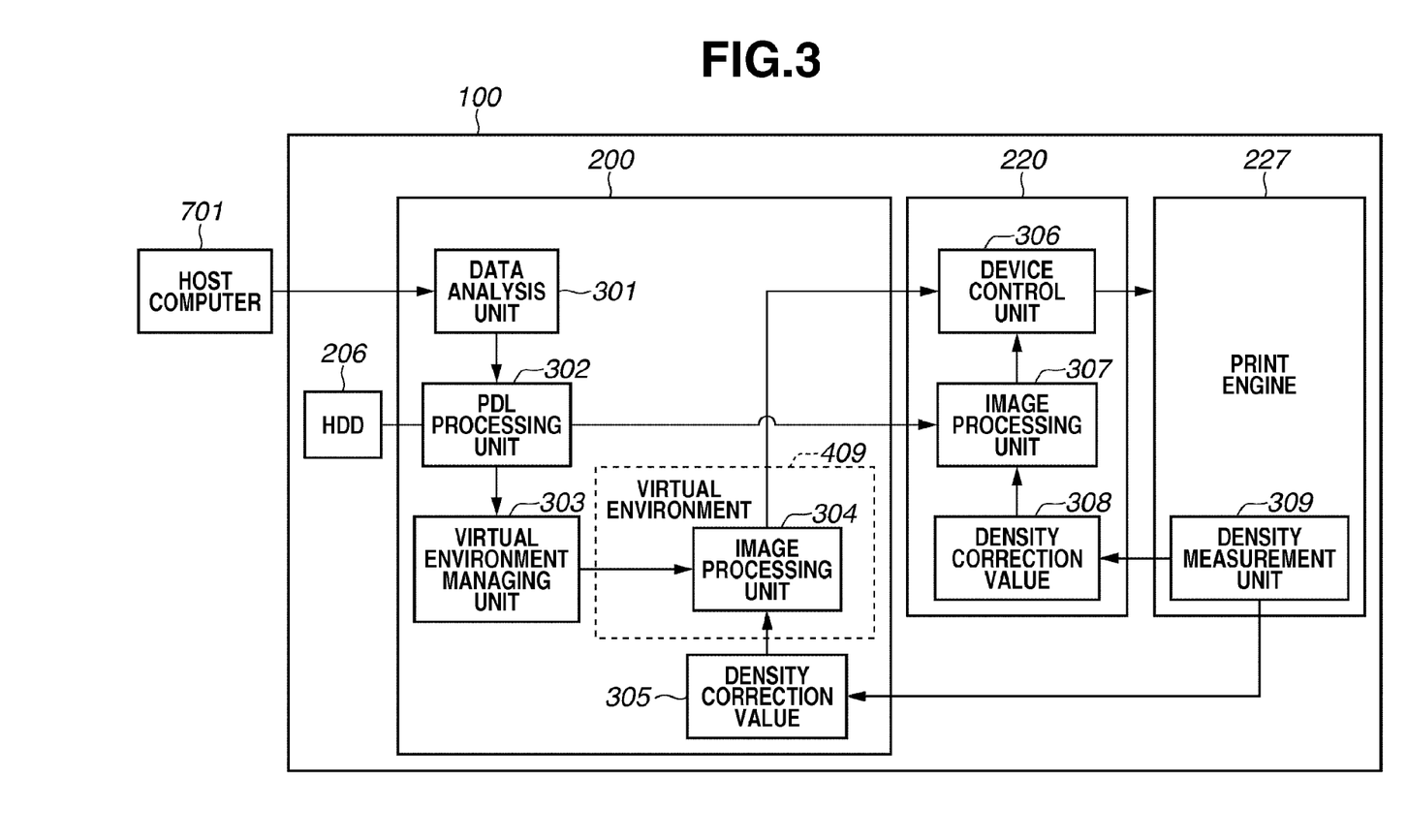
FIG. 3 is a functional configuration diagram illustrating an image forming process performed by the color LBP according to the first exemplary embodiment of the present invention.

In FIG. 3, the information processing apparatus (host computer) 701 sends an image forming request to the color LBP 100. The image forming process is performed by the main board 200 and the sub board 220 of the controller board and the print engine 227 in the color LBP 100.

In the main board 200, acting for information processing, the data analysis unit 301 analyzes the image forming request from the information processing apparatus 701. As a result of the analysis, the data analysis unit 301 stops the processing if the data is unprocessible, and sends an error message to the information processing apparatus 701, whereas the data analysis unit 301 transfers the data to the PDL processing unit 302 if the data is processible. The PDL processing unit 302 analyzes the image output command, which is referred to as PDL (page description language) contained in the thus-received data, and generates intermediate data, which is then temporarily stored in the HDD 206.

After storing the intermediate data in the HDD 206, the PDL processing unit 302 waits for determination of the sub board 220, acting for image forming process, whether the sub board 220 can accept the processing (i.e., whether the sub board 220 is in a processing-enabled or processing-disabled state). Then, the PDL processing unit 302 transfers the intermediate data to the image processing unit 304 running on the virtual environment or to the image processing unit 307 in the sub board 220 according to the determination.

More specifically, if the sub board 220 is in an acceptable state (i.e., if the sub board 220 is in a processing-enabled state), the PDL processing unit 302 reads the intermediate data from the HDD 206 and transfers the intermediate data to the image processing unit 307. Subsequently, the image processing unit 307 performs image processing, such as density correction, color processing, scaling, based on the generated intermediate data, thereby generating a print image. As described above, after completing the processing with respect to the intermediate data, the device control unit 306 sends the print image to the print engine 227 to obtain a print output.

On the other hand, if the sub board 220 is not in an acceptable state (i.e., if the sub board 220 is in a processing-disabled state), the PDL processing unit 302 reads the intermediate data from the HDD 206 and transfers the intermediate data to the image processing unit 304 running on the virtual environment 409, which is activated by a virtual environment managing unit 303 (description thereof will be provided below with reference to FIG. 4). Subsequently, the image processing unit 304 performs image processing, such as density correction, color processing, scaling, based on the generated intermediate data, thereby generating a print image. Accordingly, after completing the processing with respect to the intermediate data, the image processing unit 304 transfers the print image to the device control unit 306. Then, the device control unit 306 sends the print image to the print engine 227, thereby obtaining a print output.

Further, the image processing unit 304 and the image processing unit 307 are connected to the density measurement unit 309 of the print engine 227, so that a value measured by the density measurement unit 309 is used for image processing as a density correction value 305 or 308. Here, the image processing unit 304 and the image processing unit 307 can be so configured that the measured value obtained from the density measurement unit 309 is temporarily stored in a storage medium, such as the HDD 206.

Figure 4:
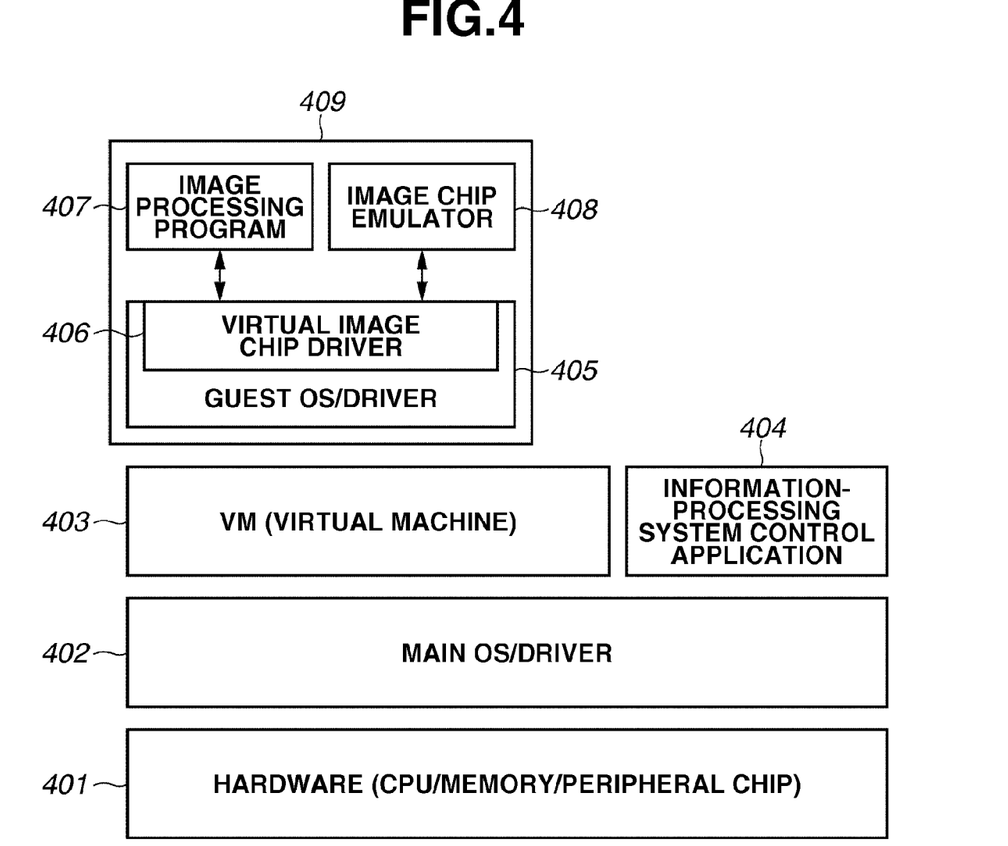
FIG. 4 is a block diagram illustrating a process performed when a virtual technique runs on a main board of the color LBP according to the first exemplary embodiment of the present invention.

FIG. 4 is a block diagram illustrating a process in the case where the virtual technique is applied to the main board 200 acting for information processing. As described above with reference to FIG. 2, the main board 200 includes the CPU 202, the volatile memory 203, and a hardware resource 401 such as peripheral chips. In the main board 200, a main operating system (OS)/driver 402 controls the hardware resource 401 to provide a program executable environment, so that an information-processing system control application 404 runs on the environment.

On the main board 200, a virtual machine (VM) 403 can run under the executable environment provided by the main OS/driver 402, and the virtual environment 409 can run on the VM 403. In other words, the VM 403 is an emulation program of the hardware resource 401 that virtually establishes the access of a guest OS/driver 405 running on the virtual environment 409 to the hardware resource 401.

Further, an image processing program 407 and an image chip emulator 408 run on the guest OS/driver 405. The image processing program 407 calls a virtual image chip driver 406 in order to use an image chip (not shown) which performs image processing at high speed. The virtual image chip driver 406 calls the image chip emulator 408 to cause the image chip emulator to perform image processing, since there is no image chip on the main board 200. Then, the virtual image chip driver 406 sends the processing result to the image processing program 407. With the above-described virtual technique, the image processing unit 304 can run on the virtual environment 409 in a similar manner as the process performed by the image processing unit 307 of the sub board 220.

Figure 5:
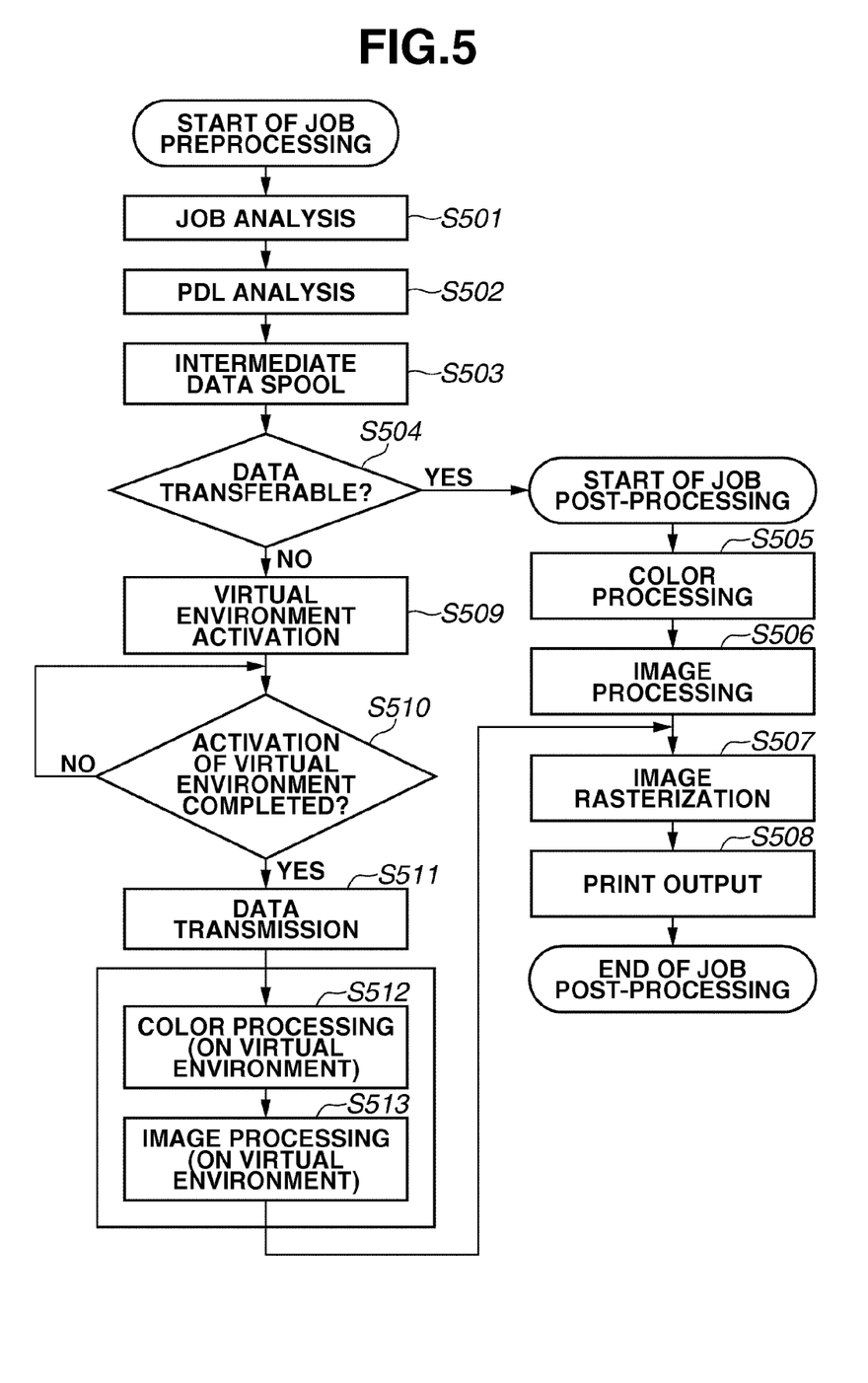
FIG. 5 is a flowchart illustrating an image forming process performed by the color LBP according to the first exemplary embodiment of the present invention.

Now, a flow of the image forming process performed by the controller board of the color LBP 100 according to the present exemplary embodiment will be described with reference to a flow chart illustrated in FIG. 5.

Initially, when the color LBP 100 receives a job from the host computer 701, the data analysis unit 301 analyzes the job in step S501. As a result of the analysis, if the format of the job is normal and the job includes PDL, the PDL processing unit 302 analyzes the PDL in step S502.

Next, in step S503, the PDL processing unit 302 stores (spools) the intermediate data, which is divided into objects, such as characters, graphics, and images, obtained by the PDL analysis in the HDD 206 or the like.

When the storage of the intermediate data resulting from the PDL analysis is completed, whether the sub board 220 can accept the image forming process is determined (detected) in step S504. The detection is performed by the CPU 202 via the bus controller 204. Further, examples of cases where the sub board 220 cannot accept the image forming process include the case where the sub board 220 is in a sleep mode, the case where the sub board 220 is in a rebooting process, and the case where the user himself stops the process.

If it is determined that the sub board 220 can accept the image forming process in step S504 (YES in step S504), processes after step S505 of the image forming process are executed by the sub board 220.

In step S505, the image processing unit 307 performs color processing on the intermediate data stored in step S503. Here, the print output is adjusted to the assumed density by using the density correction value 308 obtained from the density measurement unit 309.

Subsequently, in step S506, the image processing unit 307 performs other predetermined image processing, and thereafter, rasterizes the thus-obtained image data into an image memory in step S507. After the rasterization of the image data into the image memory is completed, then in step S508, the device control unit 306 controls the print engine 227 to print and output image data.

On the other hand, in step S504, if it is determined that the sub board cannot accept the image forming processing (NO in step S504), then in step S509, the virtual environment managing unit 303 activates the virtual environment 409 to allow the image processing unit 304 to run on the virtual environment 409. In step S510, the virtual environment managing unit 303 determines whether the virtual environment is activated. If the virtual environment is activated (YES in step S510), then in step S511, the PDL processing unit 302 transfers the intermediate data stored in step S503 to the image processing unit 304 running on the virtual environment 409.

In step S512, the image processing unit 304 performs color processing on the intermediate data, and performs other predetermined image processing in step S513. Here, the image processing is measured by the density measurement unit 309 and performed by using the density correction value 305 stored in the HDD 206 or the like after the measurement values are obtained periodically by the main board 200. The processing in steps S512 and S513 is performed by the image processing program 407 and the image chip emulator 408 illustrated in FIG. 4, respectively, as described above.

Then, in step S507, the image processing unit 304 rasterizes the image data generated in step S513 into the image memory. In step S508, the device control unit 306 controls the print engine 227 to print and output image data. In the present process, the timing at which the image processing unit 304 rasterizes the image data into the image memory in step S507 is matched to the timing at which the sub board 220 comes into the processing-enabled state. Further, the image data to be transferred is that which has been subjected to processing similar to that performed in steps S505 and S506 (i.e., the image processing data which has been subjected to processing for every image forming unit).

Further, in the above-described process, the image data is rasterized into the image memory in step S507 after the processing of step S513 is completed. However, the image data can be transferred to the sub board 220 at the time when the sub board 220 becomes ready to process the image data. In this case, the image processing unit 307 of the sub board 220 takes over the process of image processing. Here, it can be arbitrarily selectable by the color LBP 100 if the image processing by the sub board 220 is stopped at a predetermined timing or if the image processing by the sub board 220 is stopped after the processing of steps S512 and S513 is completed.

Further, in the above process, the processing performed in steps S512 and S513 is similar to the image processing performed by the sub board 220. However, if what is performed by the sub board 220 is general image processing, the user can execute only a general image processing program.

As described above, in the present exemplary embodiment, in the case where the sub board 220 acting for image processing is in the processing-disabled state, the image forming apparatus activates the virtual environment on the main board 200 acting for information processing and activates the program for emulating the image processing which is normally performed by the sub board 220. Then, the image forming apparatus performs the image processing on the main board 200 and transfers the image data obtained by the image processing to the sub board 220 at the time when the sub board 220 comes into the processing-enabled state to thereby print and output image data. With the above-described configuration, for example, the power supply to the sub board 220 and the print engine 227 can be optimized by supplying power to the sub board 220 only as required, thereby effectively saving power consumption. Further, even in the case where the sub board 220 cannot temporarily accept the processing due to overload or the like, a part of or all of the image processing can be performed according to the virtual environment on the main board 200, so that the down time can be minimized and throughput is expected to be increased, which can eliminate a delay of processing.

Still further, the image processing unit 304 at the main board 200 side performs processing similar to that of the image processing unit 307 at the side of the sub board 220, so that the image can be prevented from deterioration or the like, and thus a desired image can be obtained. Specifically, since the image processing unit 304 performs the image processing by using the density correction value 305, which is a property of the print engine, from the density measurement unit 309, the image processing unit 304 can produce an image having quality similar to that processed by the image processing unit 307. Incidentally, in the present exemplary embodiment, the density measurement value is exemplified as the property of the print engine. However, the property can be any other inherent image processing parameter.

Now, a second exemplary embodiment of the present invention will be described below. While, in the first exemplary embodiment, the virtual environment is implemented in the main board 200, the virtual environment can be implemented also in the sub board 220 in addition to the main board 200 in the present exemplary embodiment.

Figure 6:
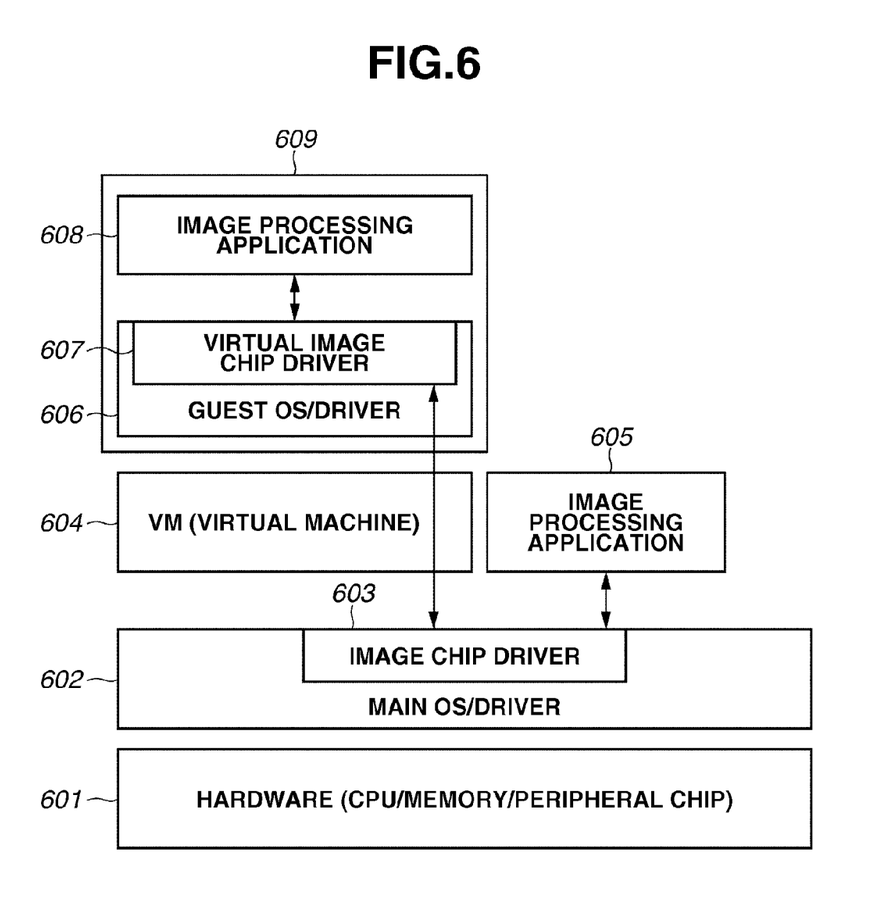
FIG. 6 is a block diagram illustrating an example of how to run the virtual environment on a sub board of the multicolor LBP according to a second exemplary embodiment of the present invention.

Now, how to implement the virtual environment in the sub board 220 will be described below with reference to FIG. 6. In the following description, components similar to those of the first exemplary embodiment are represented by the same reference symbols.

The sub board 220 according to the present exemplary embodiment executes an image processing application 605 under administration of a main OS/driver 602, which uses a hardware resource 601 including the CPU 222, the volatile memory 223, an image chip, and the like as illustrated in FIG. 2. The image processing application 605 obtains intermediate data from the PDL processing unit 302 of the main board 200 and performs image processing such as color processing, density correction, and scaling based on the intermediate data. Further, the image processing application 605 performs the image processing at high speed by using the image chip via an image chip driver 603. Then, after completing the image processing, the image processing application 605 controls the print engine 227 to allow the print engine 227 to print an image.

In order to run the virtual environment on the sub board 220, it is required to run a VM 604 on the main OS/driver 602 in a similar manner as performed by the configuration of the first exemplary embodiment. Here, in the present exemplary embodiment, the VM 604 loads a guest OS/driver 606 in a virtual environment 609. Accordingly, an image processing application 608 runs on the guest OS/driver 606.

In the above-described first exemplary embodiment, the image chip of the virtual image chip driver 406 running on the virtual environment of the main board 200 does not exist in the apparatus, so that the image processing is performed by the image chip emulator 408. On the other hand, the image chip for performing the image processing exists in the apparatus according to the present exemplary embodiment. Therefore, the image processing application 608 calls and accesses a virtual image chip driver 607 on the virtual environment 609, while the virtual image chip driver 607 directly accesses the image chip driver 603 to perform image processing. In other words, the virtual image chip driver 607 is configured to perform the image processing by the image chip via the image chip driver 603 when the virtual image chip driver 607 receives the image processing request from the image processing application 608.

With the above-described configuration, in the present exemplary embodiment, the virtual environment 409 running on the main board 200 is transferred to the sub board 220 while the sub board 220 comes into the processing-disabled state, where the processing can be recovered by the image processing application 608. Further, in the present exemplary embodiment, the processing can be stopped at a predetermined timing on the virtual environment, and the thus stopped virtual environment itself can be transferred to another system which can provide a similar virtual environment, where the virtual environment can be recovered from its stopped state. With the above-described configuration, for example, if the sub board 220 comes into the processing-enabled state while the image processing is performed under the virtual environment on the main board 200, the virtual environment on the main board 200 can be stopped and transferred to the sub board 220, where the image processing can be restarted. In this case, the effect of high speed processing by the image chip provided by the sub board 220 can be joined in the image forming process.

As described above, in the present exemplary embodiment, such a configuration of the sub board 220 that the virtual environment can be implemented also on the sub board 220 enables stopping the virtual environment running on the main board 200 at the time when the sub board 220 comes into the processing-enabled state and to transfer the virtual environment running on the main board 200 to the sub board 220. The implementation of the thus-transferred virtual environment in the sub board 220 enables high speed image processing by using the image chip of the sub board 220. Here, it is described above that the virtual environment on the main board 200 is transferred to the sub board 220 when the sub board 220 comes into the processing-enabled state while the image processing is performed under the virtual environment on the main board 200. However, whether to transfer the virtual environment can be set arbitrarily.

Now, a third exemplary embodiment of the present invention will be described below. In the first and the second exemplary embodiments, the virtual environment is activated on the main board 200 or on the sub board 220 of the image forming apparatus itself. However, in the present exemplary embodiment, the virtual environment is activated by the image forming apparatus via the communication controller 207 if the image forming apparatus can communicate with another image forming apparatus, the image processing is performed under the virtual environment of the other image forming apparatus to obtain generated image data. In the present exemplary embodiment, as described in the above second exemplary embodiment, the virtual environment including the image processing application and the image chip emulator can be transferred to and activated on the other image processing apparatus. Further, the configuration of the present exemplary embodiment can be combined with the configuration of the first exemplary embodiment or the second exemplary embodiment. In this case, however, the virtual environment is activated on the other image forming apparatus and whether to perform the image processing under the virtual environment is set arbitrarily.

According to the above-described present exemplary embodiment, the image forming process can be performed by using the other image forming apparatus via a local area network (LAN) or the like. Accordingly, for example, even in the case of an excessive load of processing in the main board of the image forming apparatus, a decrease of the throughput of the image forming process can be minimized.

In order to realize the present invention, a computer-readable storage medium for storing program code (computer program) of software which realizes the functions of the above-described exemplary embodiment can be employed. In this case, the present invention is achieved such that the computer-readable storage medium is to be supplied to the system or the apparatus and a computer (or a CPU or a micro processing unit (MPU)) of the system or the apparatus reads and executes the program code stored in the computer-readable storage medium.

In this case, the program code read from the computer-readable storage medium itself realizes the functions of the above-described exemplary embodiment, and thus the program code itself and the computer-readable storage medium storing the program code are encompassed within the scope of the present invention.

Examples of the computer-readable storage medium which provides the program code can include, for example, a floppy disk, a hard disk, an optical disk, a magnetic optical disk, a compact disc-ROM (CD-ROM), a CD-recordable (CD-R), a magnetic tape, a non-volatile memory card, and a ROM.

Further, the present exemplary embodiment includes such a configuration that performs a part or the all of the actual process by an OS (basic system or operating system) or the like which runs on a computer based on an instruction of the program code.

Still further, the program code read from the computer-readable storage medium can be written in a memory of a function expansion board which is inserted into the computer or a function expansion unit which is connected to the computer. In this case, the CPU or the like of the functional extension board or the function expansion unit can perform a part or the all of the actual processing based on the instruction of the thus-written program code.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures, and functions.

This application claims priority from Japanese Patent Application No. 2008-092207 filed on Mar. 31, 2008, which is hereby incorporated by reference herein in its entirety.

What is claimed is:

1. An image forming apparatus comprising a first system, a second system, and an output engine, and configured to process input data via the first system and the second system and to output the processed data as an image via the output engine,
   wherein the first system comprises:
      a first communication unit configured to communicate with the second system;
      a detection unit configured to detect whether the second system is in a processing-disabled state;
      a virtual environment activation unit configured to activate a virtual environment running on the first system if the detection unit detects that the second system is in the processing-disabled state; and
      a first image processing unit configured to perform image processing under the virtual environment,
   wherein the second system comprises:
      a second communication unit configured to communicate with the first system;
      a second image processing unit configured to perform image processing on data received from the first system; and
      an output engine control unit configured to control the output engine, and
   wherein the output engine is configured to output the processed data as an image under control of the output engine control unit.

2. The image forming apparatus according to claim 1, wherein the first image processing unit is configured to perform image processing using a property of the output engine.

3. The image forming apparatus according to claim 1, wherein the output engine includes an output engine property measurement unit configured to measure a property of the output engine.

4. The image forming apparatus according to claim 1, wherein the first communication unit is configured to communicate with the first image processing unit when the virtual environment activation unit activates the virtual environment if the detection unit detects that the second system is in the processing-disabled state.

5. The image forming apparatus according to claim 1, wherein the first image processing unit is configured to perform image processing via a virtual image processing driver running on the virtual environment, and
   wherein, if the image processing by the second image processing unit is performed by using hardware specific to the second system, the virtual image processing driver executes a program for emulating the hardware specific to the second system.

6. The image forming apparatus according to claim 5, wherein the program for emulating the hardware specific to the second system performs image processing using a property of the output engine.

7. The image forming apparatus according to claim 1, further comprising a unit configured to select whether to stop the image processing performed by the first image processing unit in units of image forming or at a predetermined point of time when the second system comes into a processing-enabled state.

8. The image forming apparatus according to claim 1, further comprising a unit configured to select whether to transfer the virtual environment to the second system via the first communication unit or to transfer data processed in units of image forming to the second system via the first communication unit, when the second system comes into a processing-enabled state.

9. The image forming apparatus according to claim 1, further comprising a unit configured to select whether to activate the virtual environment on the first system of the image forming apparatus or another image forming apparatus to perform image processing, or to transfer and activate the virtual environment to and on the first system of the image forming apparatus or another image forming apparatus to perform image processing, if the detection unit detects that the second system is in the processing-disabled state.

10. The image forming apparatus according to claim 1, wherein the first system includes an information processing system and the second system includes an image processing system.

11. A method for an image forming apparatus comprising a first system, a second system, and an output engine, and configured to process input data via the first system and the second system and to output the processed data as an image via the output engine, the method comprising:

communicating with the second system from the first system;

detecting whether the second system is in a processing-disabled state;

activating a virtual environment running on the first system if the second system is detected to be in the processing-disabled state;

performing image processing with an image processing unit running on the virtual environment;

communicating with the first system from the second system;

performing image processing, with the second system, on data received from the first system;

controlling the output engine; and outputting the processed data as an image by controlling the output engine.

12. The method according to claim 11, further comprising communicating with the image processing unit running on the virtual environment when the virtual environment is activated if the second system is detected to be in the processing-disabled state.

13. A non-transitory computer-readable storage medium storing a program for causing a computer to perform a method for an image forming apparatus comprising a first system, a second system, and an output engine, and configured to process input data via the first system and the second system and to output the processed data as an image via the output engine, the method comprising:

communicating with the second system from the first system;

detecting whether the second system is in a processing-disabled state;

activating a virtual environment running on the first system if the second system is detected to be in the processing-disabled state;

performing image processing with an image processing unit running on the virtual environment;

communicating with the first system from the second system;

performing image processing, with the second system, on data received from the first system;

controlling the output engine; and outputting the processed data as an image by controlling the output engine.

* * * * *